Oct. 3, 1939.  A. J. CHERRY ET AL  2,174,968
SCREW MAKING MACHINE
Filed Oct. 10, 1938  2 Sheets-Sheet 1
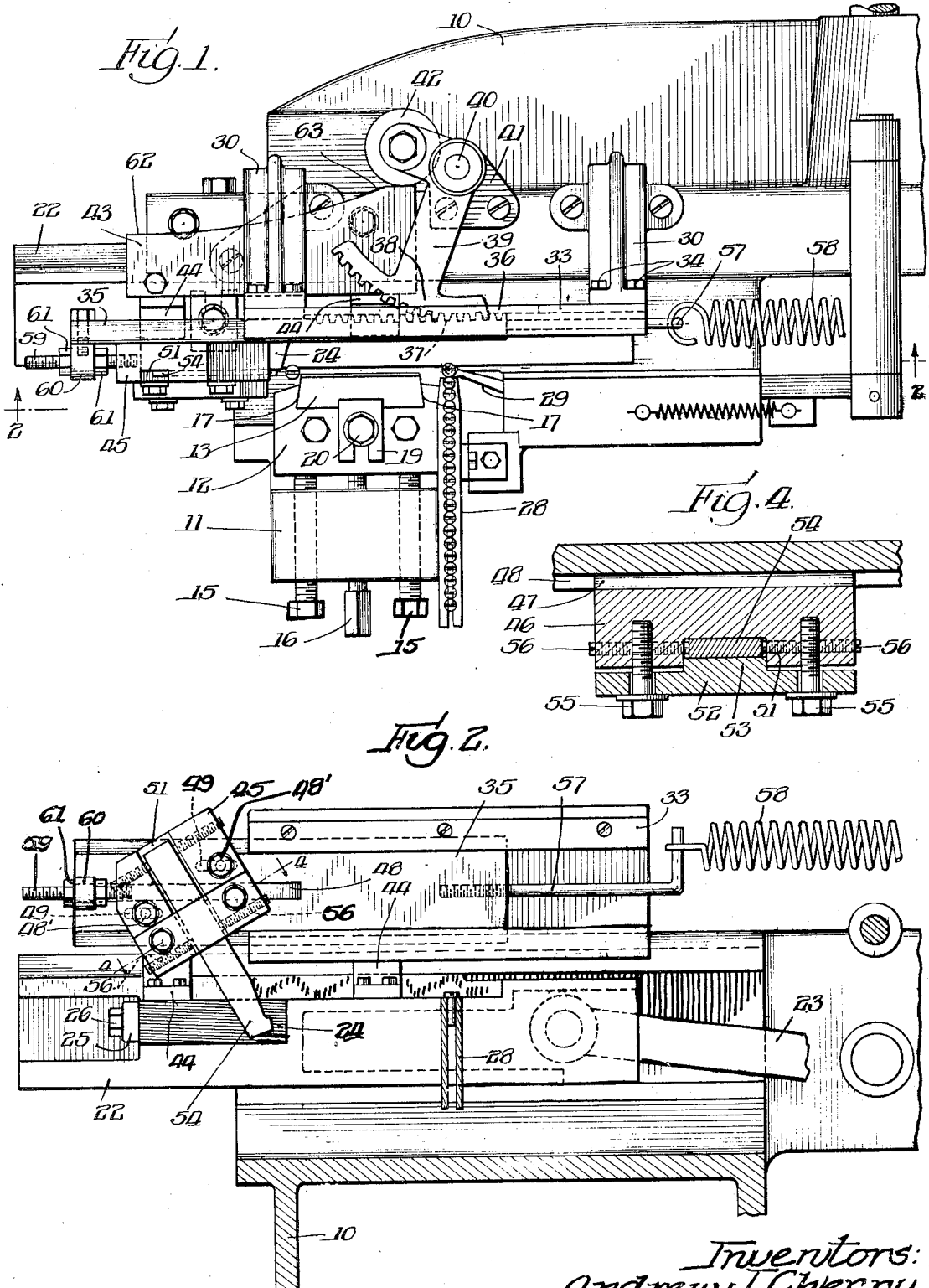
Inventors:
Andrew J. Cherry
Andrew J. Jaskowiak,
By Wilkinson, Huxley, Byron, & Knight
attys.

Oct. 3, 1939.  A. J. CHERRY ET AL  2,174,968
SCREW MAKING MACHINE
Filed Oct. 10, 1938  2 Sheets—Sheet 2
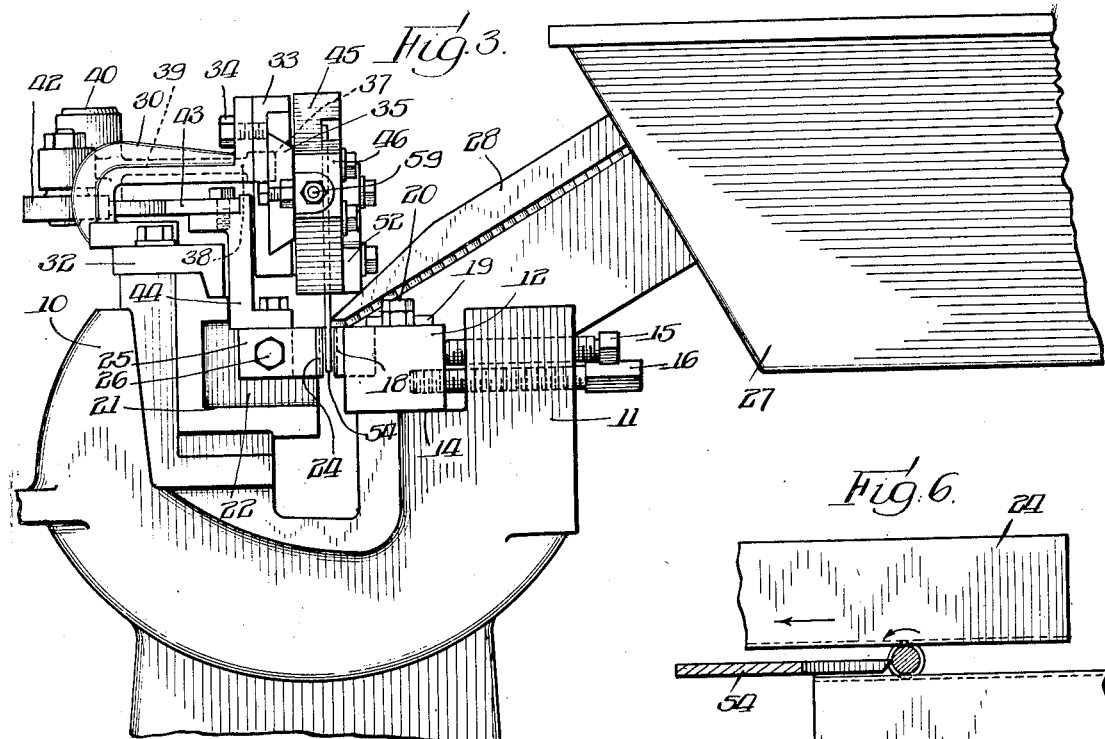
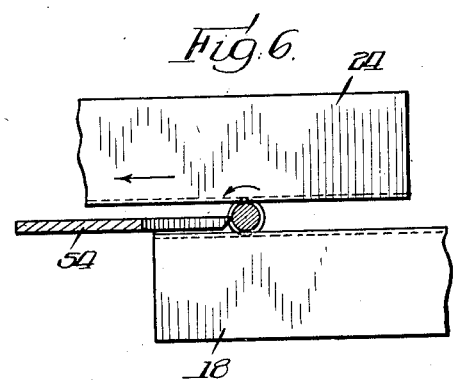
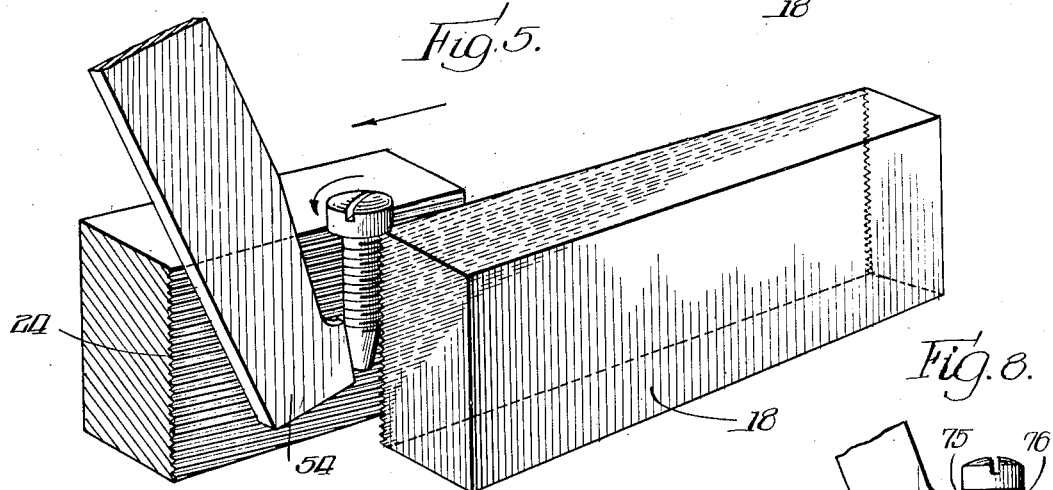
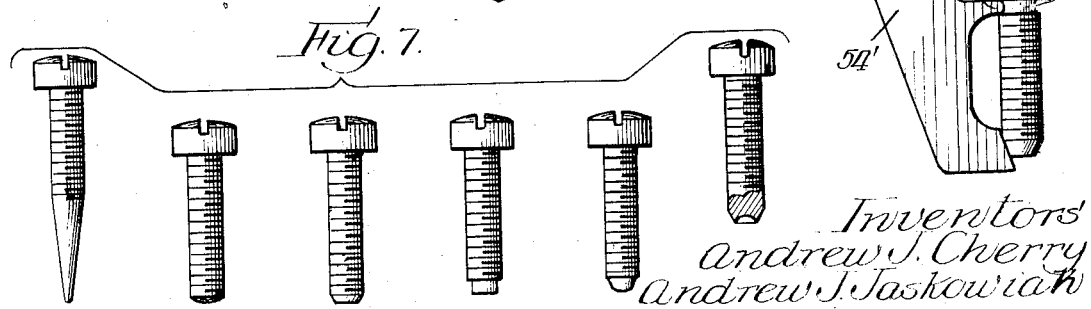
Inventors
Andrew J. Cherry
Andrew J. Jaskowiak
By Wilkinson Huxley Byron & Knight attys Patented Oct. 3, 1939

2,174,968

UNITED STATES PATENT OFFICE 2,174,968

SCREW MAKING MACHINE

Andrew J. Cherry and Andrew J. Jaskowiak, Chicago, Ill., assignors to Economy Screw Corporation, Chicago, Ill., a corporation of Illinois Application October 10, 1938, Serial No. 234,096

13 Claims. (Cl. 10—4)

This invention relates to a new and improved machine of the type employing threading die blocks for rolling threads on screws having an attachment thereon presenting a cutting tool, in cutting association with the shank of the screw and modifying the form thereof during the thread rolling operation.

This invention also relates to the novel process of utilizing the die blocks as a holding, positioning and rotating means for the screw during the machining operation effected by a cutting tool held in cutting association with the shank thereof.

The principal object of this invention is to provide a new and improved means for rounding, pointing or otherwise forming the ends of screws during the thread rolling operation whereby the usual machining operation for this purpose is eliminated.

As an article of commerce, screws are desirable which have ends rounded, pointed or otherwise furnished for service in various industrial uses. For instance, it is frequently required that the ends of screws be reduced and finished in order that they may be quickly centered and threaded in the screw receiving opening. Further, a reduced or tapered end is required on self-threading screws. Similarly, various special end formations are desirable in different industrial uses.

In accordance with usual manufacturing practice, screws such as machine screws are made by first cutting a length of wire or round bar stock which is presented to an upsetting tool which forms a head thereon. When self-threading screws are desired, the tapered end thereof is sometimes formed prior to the threading operation by the upsetting tool. In such cases, the shank of the stock will be forced into a tapered opening whereby the pressure of the head-forming die also presses a tapered end on the screw blank.

This process gives satisfactory results but has certain attendant difficulties both in manufacturing cost and in the nature of the finished screw. It is found in practice that the thread rolling operation with blanks of tapered form results in an imperfect thread on account of the fact that the die blocks exert a tendency to cut a double thread of gradually increasing prominence as the diameter of the blank diminishes. Furthermore, the upsetting dies employed are necessarily limited as to depth and can only be used for screws of a single length. This is expensive and increases the manufacturing cost.

The other alternative, prior to this invention, was that of employing a separate machining operation after the screw thread is formed. This method gives very satisfactory results but involves the additional and expensive machining operation which adds tremendously to the manufacturing cost. In many instances this step of the process is more costly than the preceding screw-forming steps.

By means of the present invention, the screws may be subjected to the usual thread rolling operation, and by virtue of the fact that the end forming tool operates during the thread rolling process, the screw emerges in its finished and final form without additional cost or handling.

The machine of this invention may be more readily understood by referring to the accompanying drawings, in which—

Figure 1 is a plan view of a conventional form of thread rolling machine equipped with the attachment of this invention;

Figure 2 is a side elevational view in cross section taken on the line 2—2 of Figure 1, and looking in the direction of the arrows;

Figure 3 is an end elevational view of the machine illustrated in Figure 1, looking from left to right;

Figure 4 is an enlarged cross sectional view taken on the line 4—4 of Figure 2 and looking in the direction of the arrow;

Figure 5 is an enlarged perspective view showing the die blocks and the screw during the threading operation and its relationship to the end-forming cutting tool;

Figure 6 is an enlarged plan view showing the die blocks, screw and cutting tool;

Figure 7 is a view of various forms of screws which may be conveniently produced by means of this invention; and Figure 8 shows a modified form of the cutting tool of this invention shown in Figure 5, constructed to cut a groove on the shank of the screw in addition to forming the end thereof.

By referring to the drawings, it will be noted that this invention is illustrated in connection with a screw thread rolling machine of conventional construction, comprising a frame 10 having an upstanding portion 11 adapted to adjustably receive the supporting block 12 which serves as a mounting for the stationary die block 13. The supporting block is mounted on the step 14 and is adapted to be adjusted toward and away from the movable die block by means of screws 15 having swiveled engagement with the supporting block 12 and threaded engagement in the portion 11 of the frame. After proper adjustment of the supporting block 12, the block is anchored in position by means of holding screw 16 which is likewise threaded in the frame part 11 and adapted to abutment with the holding block 12.

The holding block 12 is provided with a dovetailed opening 17 in which is positioned the stationary die block 13 formed of corresponding shape. Die block 13 is held against accidental movement by means of the plate 19 and holding screw 20. On the opposite side of the frame 10, a slide guideway 21 is provided for receiving the reciprocating carriage 22. This carriage is best shown in Figure 2. The reciprocation thereof is effected by means of a pitman 23 operated by a crank from a suitable source of power (not shown). The reciprocating carriage is provided with a suitable opening for mounting the movable die block 24, which is held in place by means of a clamping plate 25 and bolt 26. The screw blanks are positioned in the container or hopper 27 and are fed by a pickup device of usual construction, in single file down the guideway 28.

The screws move by gravity as the lowermost screw is fed for rolling movement between the die blocks for each reciprocation of the machine. The positioning of the screw between the die blocks is caused by a moving finger 29, which is operated in synchronism by conventional mechanism not shown. The machine thus far described is of conventional construction and, per se, is not claimed in this application.

The novel attachment of this invention comprises the following mechanism which may be applied, with slight modification, to any conventional screw rolling machine. In the present illustration, the attachment comprises frame parts 30 which are mounted by screws on the upstanding portion 32 of the frame 10 and extend over the reciprocating carriage and serve as a mounting for the slide guide 33 attached thereto by means of bolts 34. The guide is of dovetailed shape and receives the correspondingly shaped slide 35. The guide frame 33 is cut away in the rear portion thereof as at 36 so as to expose the toothed rack 37 formed on the back of the slide 35. The rack is mounted in engagement with gear segment 38 formed on one end of a bell crank lever 39 which is pivoted on a shaft 40 and mounted by means of a bracket 41 on the frame 10. The other arm of the bell crank has a roller 42 pivotally mounted thereon and positioned for engagement with a cam plate 43, which is rigidly attached for reciprocating movement with the carriage 22 by means of brackets 44. The slide 35 overlies and extends beyond the reciprocating die block and serves as a mounting for the tool holder 45.

The construction of the tool holder is best shown in Figures 2 and 4 and comprises a block 46 having a tongue 47 thereon received in the groove 48 of the slide. The block is fixed by means of screws 48' which pass through slots 49 in the block and have screw threaded engagement with openings in the slide. This permits a longitudinal adjustment of the tool holder with respect to the slide.

The block is provided with an angularly disposed groove 51 and a clamping plate 52 having a projection 53 thereon fitting in the groove 51, but of less depth than said groove. The cutting tool 54 is received in the groove 51 and held by the clamping plate 52 which is pressed in engagement with the tool by means of screws 55. The tool is preferably of less width than the groove, whereby adjustment thereof is permitted by means of the screws 56 which engage the tool on opposite sides at the lower and upper portions of the block.

The slide 35 has a hook 57 secured in the rear end thereof, as shown in Figure 2, for connection with an extension spring 58 which is anchored at its opposite end to a portion of the frame. The tool holding block is adjusted longitudinally with respect to the slide by means of a screw 59 which passes through a lug 60 and is held in adjusted position by means of nuts 61.

In operation, it will be understood that the diameter of the screw shank will be somewhat in excess of the space provided between the die blocks so that the blocks will exert a cold thread rolling effect thereon. The screw will, of course, rotate under the influence of the advancing block and advance the length of the stationary block. The rate of advancement of the screw, however, will be only one-half the rate of travel of the movable die block. It will be observed that the cam 43, which has a gradually increasing cam surface of particular formation, will act upon the roller 42 to rotate the bell crank and cause the gear segment to advance the slide 35 by its meshing contact with the rack 37. The rate of advancement of the slide can thus be determined by the particular configuration of the cam surface.

When the machine is in position to receive a screw blank, as at the commencement of the screw rolling operation, the slide 35 is held in an extreme right-hand position, as shown in Figure 1, by means of the spring against a suitable abutment, not shown, so that the cutting tool is positioned a slight distance from the commencing end of the stationary die block. Immediately thereafter, the reciprocating block starts its traversing movement and engages the screw and starts the thread rolling operation. During that portion of the movement of the screw required to bring the screw in contact with the cutting tool, the flat portion 62 of the cam is in contact with the roller 42. However, immediately upon arriving at this position the roller 42 starts up the incline portion of the cam, which causes an advancement of the slide 35 and cutting tool 54 at a rate determined by the incline. This is selected to advance the tool the slightest fraction slower than the advance of the screw whereby the screw gains on the tool an amount equal to the metal to be removed. This relationship continues until the screw approaches the opposite end of the die block, whereupon the steep incline 63 of the cam is encountered, which rapidly advances the cutting tool free of the screw. The screw is then permitted to roll to the end of the die block where it is free to fall into a suitable receptacle. Thereafter, the moving die block returns under the action of the pitman, and spring 58 serves to return the slide 35 and tool 54 as fast as the cam will permit. The operation is then repeated for each reciprocation of the machine.

What is claimed is:

1. The process which comprises rolling a thread on a screw by means of threading die-blocks and utilizing the holding and rotating influence of said die-blocks on said screw for cutting action of a tool while holding a moving tool against said screw for forming a reduced finished portion thereon.

2. The process which comprises rolling a thread on a screw by means of threading die-blocks and utilizing the holding and rotating influence of said die-blocks on said screw for cutting action of a tool held against said screw for forming a reduced finished portion thereon, said cutting action being accomplished by advancing said tool at a rate slower than the advance of said screw equal to the amount of metal to be removed.

3. In the process of rolling threads on screw blanks by rolling said blanks between threading die-blocks, the step of positioning a cutting tool against a portion of said screw for shaping said portion thereof while said screw is being rolled between the threading die-blocks and while automatically advancing said cutting tool with the advancing movement of said screw but at a rate slower by an amount sufficient to cause said cutting tool to impart the desired final shape to said screw.

4. In combination with a machine for rolling screw threads having a stationary die-block and a movable die-block, a screw cutting tool positioned between said die blocks and mounted for advancing movement with the screw, and means for advancing said tool at a predetermined rate actuated by means movable with said movable die-block.

5. In combination with a machine for rolling screw threads having a stationary die-block and a movable die-block, a screw cutting tool positioned between said die blocks and mounted for advancing movement with the screw, and means for advancing said tool at a predetermined rate comprising a cam and cam follower movable with said movable die-block.

6. In combination with a machine for rolling screw threads having a stationary die-block and a movable die-block, a screw cutting tool positioned between said die-blocks and mounted for advancing movement with the screw, and means for advancing said tool at a predetermined rate comprising a cam movable with said movable die-block and a bell crank lever having one end in following engagement with said cam and its other end attached for moving said tool.

7. In combination with a machine for rolling screw threads having a stationary die-block and a movable die-block, a screw cutting tool positioned between said die-blocks and mounted for advancing movement with the screw, a slide for said tool having a rack thereon, means for moving said slide comprising a cam movable with said movable die-block, and a bell-crank lever having one end in following engagement with said cam and its other end equipped with a gear segment in engagement with said rack.

8. In combination with a machine for rolling screw threads having a stationary die-block and a movable die-block, a screw cutting tool positioned between said die blocks and mounted for advancing movement with the screw, a slide for said tool having a rack thereon, means for moving said slide comprising a cam movable with said movable die-block, a bell-crank lever having one end in following engagement with said cam and its other end equipped with a gear segment in engagement with said rack, and means for returning said slide and tool upon the return of said cam.

9. In combination with a machine for rolling screw threads having a stationary die-block and a movable die-block, a screw cutting tool positioned between said die-blocks and mounted for advancing movement with the screw, a slide for said tool having a rack thereon, means for moving said slide comprising a cam movable with said movable die-block, a bell-crank lever having one end in following engagement with said cam and its other end equipped with a gear segment in engagement with said rack, and a spring for returning said slide and tool upon the return of said cam.

10. In combination with a machine for rolling screw threads having a stationary die-block and a movable die-block, a screw cutting tool positioned between said die-blocks and mounted for advancing movement with the screw, means for advancing said tool at a predetermined rate actuated by means movable with said movable die-block, and a holder for said tool having means for holding said tool at an angle to the vertical.

11. In combination with a machine for rolling screw threads having a stationary die-block and a movable die-block, a screw cutting tool positioned between said die-blocks, a slide for said cutting tool and a tool holder on said slide for adjustably mounting said tool in position to engage the end of said screw, and means for advancing said slide and tool at a predetermined rate actuated by means movable with and in accordance to the movement of said movable die-block.

12. In combination with a machine for rolling screw threads having a stationary die-block and a movable die-block, a screw cutting tool positioned between said die-blocks and mounted for advancing movement with the screw, means for advancing said tool at a predetermined rate comprising a cam movable with said movable die-block, and a bell-crank lever having a roller on one end in following engagement with said cam and its other end attached for moving said tool.

13. In combination with a machine for rolling screw threads having a stationary die-block and a movable die-block, a screw cutting tool positioned between said die-blocks and mounted for advancing movement with the screw, a slide for said tool having a rack thereon, means for moving said slide comprising a cam movable with said movable die block, and a bell crank lever having a roller on one end in following engagement with said cam and its other end equipped with a gear segment in engagement with said rack.

ANDREW J. CHERRY.
ANDREW J. JASKOWIAK.

CERTIFICATE OF CORRECTION.

Patent No. 2,174,968. October 3, 1939.

ANDREW J. CHERRY, ET AL.

It is hereby certified that error appears in the printed specification of the above numbered patent requiring correction as follows: Page 1, first column, line 21, for the word "furnished" read finished; page 2, second column, line 62, after the word and period "machine." insert the following three paragraphs —

In the modified form of the invention shown in Figure 8, a cutting tool 54' is provided having, in addition to its cutting edge engaging the end of the screw, a cutting member 75 which serves to form a groove 76 under the head of the screw. It is contemplated that any form of cutting device may be provided which may form one or more grooves of any desired shape on the shank of the screw as well as forming the end thereof.

In the screw shown at the right-hand side of Figure 7, a sharp ring may be formed on the bottom thereof by providing initially a depression in the end of the blank and then cutting a tapered end thereon to give the sharp edge there illustrated.

It is obvious that any type of tool may be used exerting various cutting effects to produce any type of finished end desired. Tools may be quickly changed or replaced without undue trouble or expense. It is obvious that the machine will produce at a rapid rate, finished screws of any desired shape, formed entirely during the screw rolling operation and without the difficulties attending old processes or the expense of an extra machining operation.

and that the said Letters Patent should be read with this correction therein that the same may conform to the record of the case in the Patent Office.

Signed and sealed this 14th day of November, A. D. 1939.

(Seal)

Henry Van Arsdale,
Acting Commissioner of Patents.